June 16, 1964 P. E. UTERHART 3,137,201
EASILY THREADED PROJECTOR
Filed April 6, 1961 9 Sheets-Sheet 1

Inventor:
Philip E. Uterhart
By Robert F. Michler Atty.

June 16, 1964 P. E. UTERHART 3,137,201
EASILY THREADED PROJECTOR
Filed April 6, 1961 9 Sheets-Sheet 3

Inventor:
Philip E. Uterhart
By Robert F. Michler Atty.

June 16, 1964 P. E. UTERHART 3,137,201
EASILY THREADED PROJECTOR
Filed April 6, 1961 9 Sheets-Sheet 6

Inventor:
Philip E. Uterhart
By Robert F. Miehle, Atty.

June 16, 1964 P. E. UTERHART 3,137,201
EASILY THREADED PROJECTOR
Filed April 6, 1961 9 Sheets-Sheet 8

Inventor:
Philip E. Uterhart
By Robert F. Miehle Atty.

United States Patent Office 3,137,201
Patented June 16, 1964

3,137,201
EASILY THREADED PROJECTOR
Philip E. Uterhart, Park Ridge, Ill., assignor to Bell & Howell Company, Chicago, Ill., a corporation of Illinois
Filed Apr. 6, 1961, Ser. No. 101,204
7 Claims. (Cl. 88—17)

This invention relates to an easily threaded projector, and more particularly to a straight-line threaded projector.

An object of the invention is to provide a new and improved mechanism for easily threading a projector.

Another object of the invention is to provide a new and improved projector in which a film may be placed in a substantially straight line in front of an aperture plate and sprockets behind a pressure plate and as the pressure plate is moved to the aperture plate, the sprockets are rotated in in-running directions to form loops in the film after which the sprockets are clutched in to a drive which rotates the sprockets in the same direction.

Another object of the invention is to provide new and improved mechanisms for rotating supply and take-up sprockets in in-running directions to form loops in a film being threaded and then rotate both the sprockets in the same direction.

A complete understanding of the invention may be obtained from the following detailed descriptions of a projector forming a specific embodiment thereof, when read in conjunction with the appended drawings, in which.

The invention provides a motion picture projector having a manually actuated mechanism which first simultaneously rotates a pair of sprockets in in-running directions and moves sprocket guards and a pressure plate from retracted positions to positions holding a film on the sprockets and against an aperture plate and then causes the sprockets to be rotated in the same direction and the intermittent film feed at the aperture plate to advance the film. Preferably the projector includes a carriage carrying sprocket guards and a pressure plate in the central portion thereof, the carriage being moved from its threading position to its operating position and rotates the sprockets by rack members carried by the carriage and engaging the sprockets, clutch means being provided to connect the drive to the sprockets as the carriage reaches its operative position.

Figure 4:
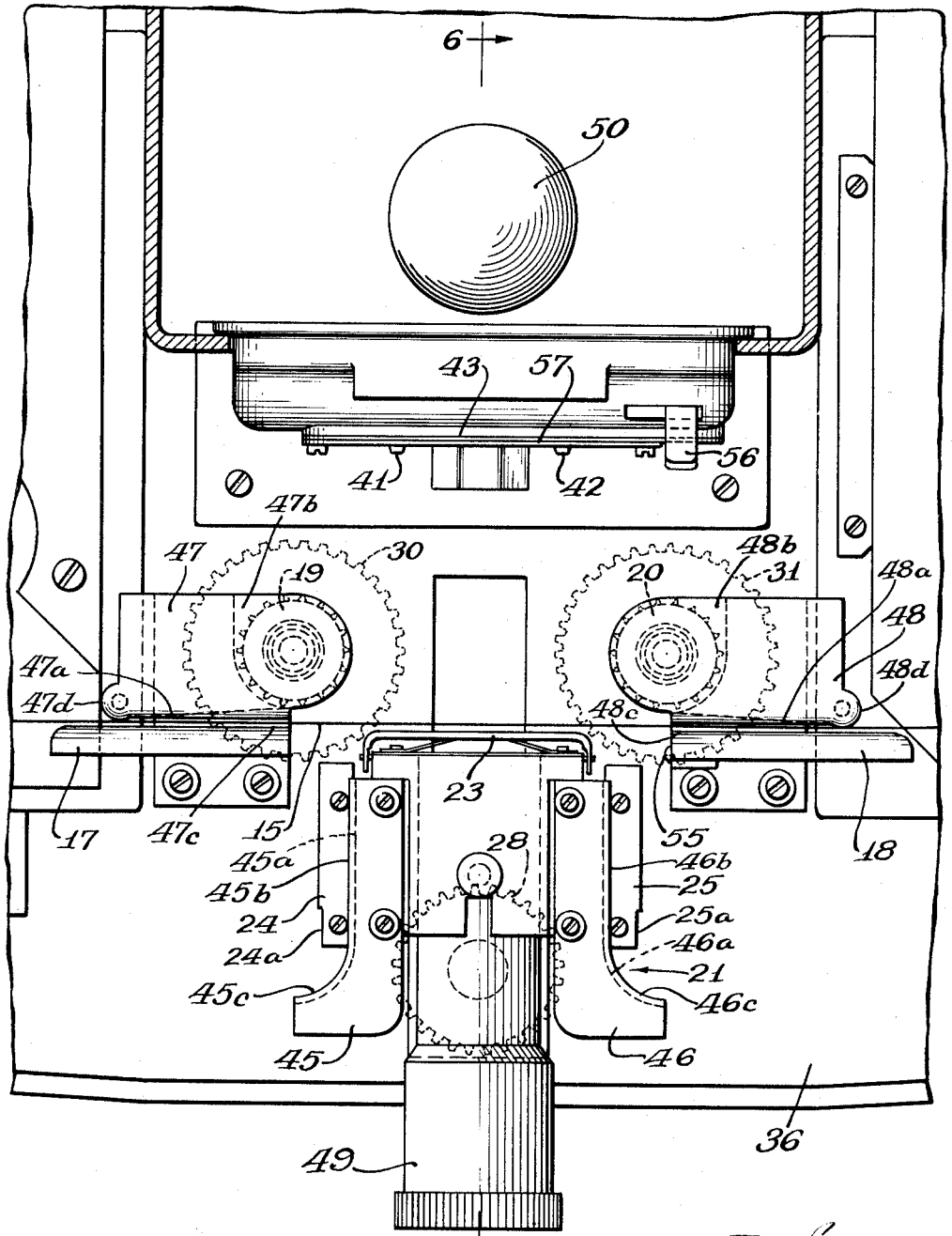
FIG. 4 is an enlarged, fragmentary top plan view of the projector of FIG. 1.
Figure 5:
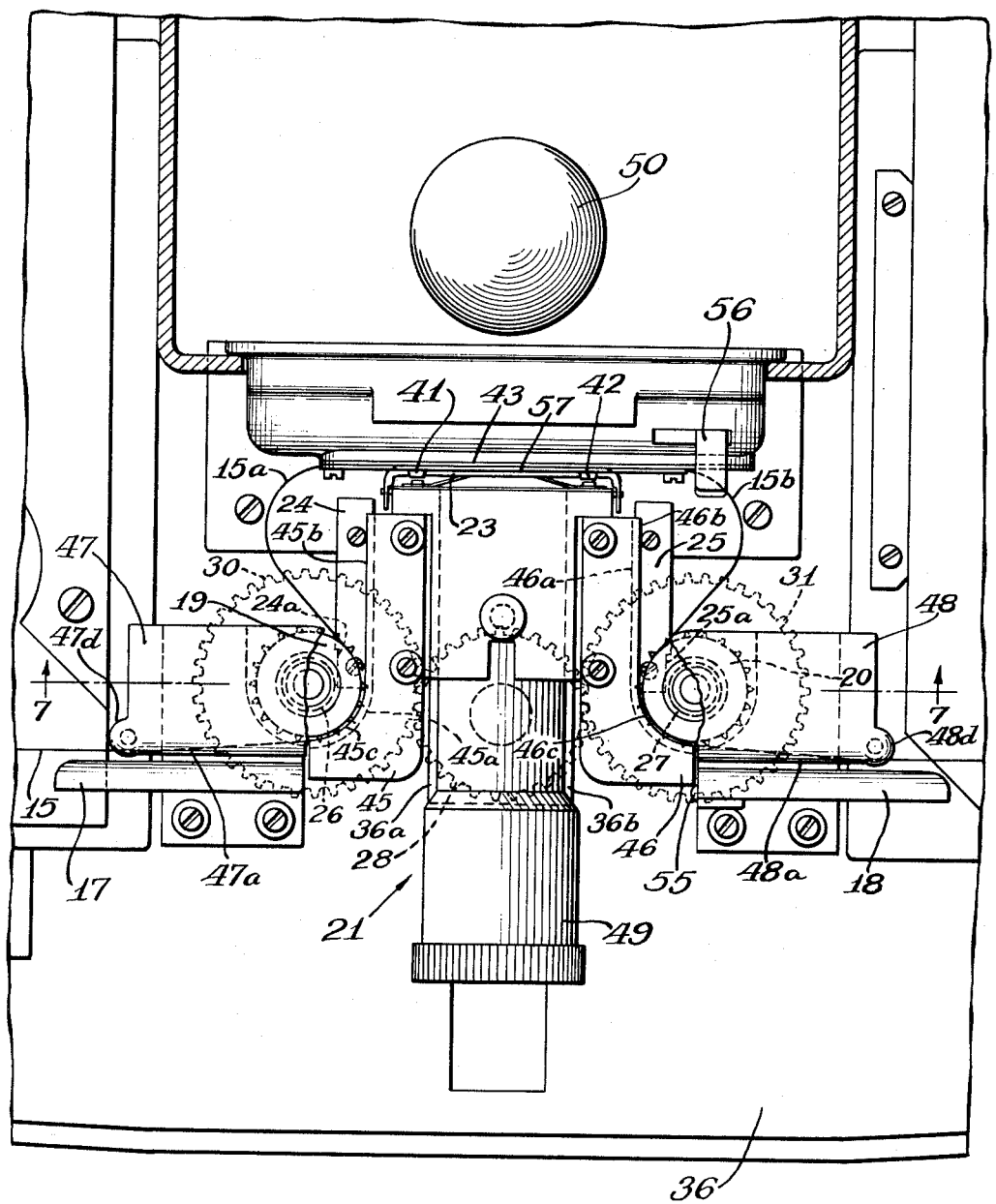
FIG. 5 is a view similar to FIG. 4 but with parts of the projector in different positions.
Figure 7:
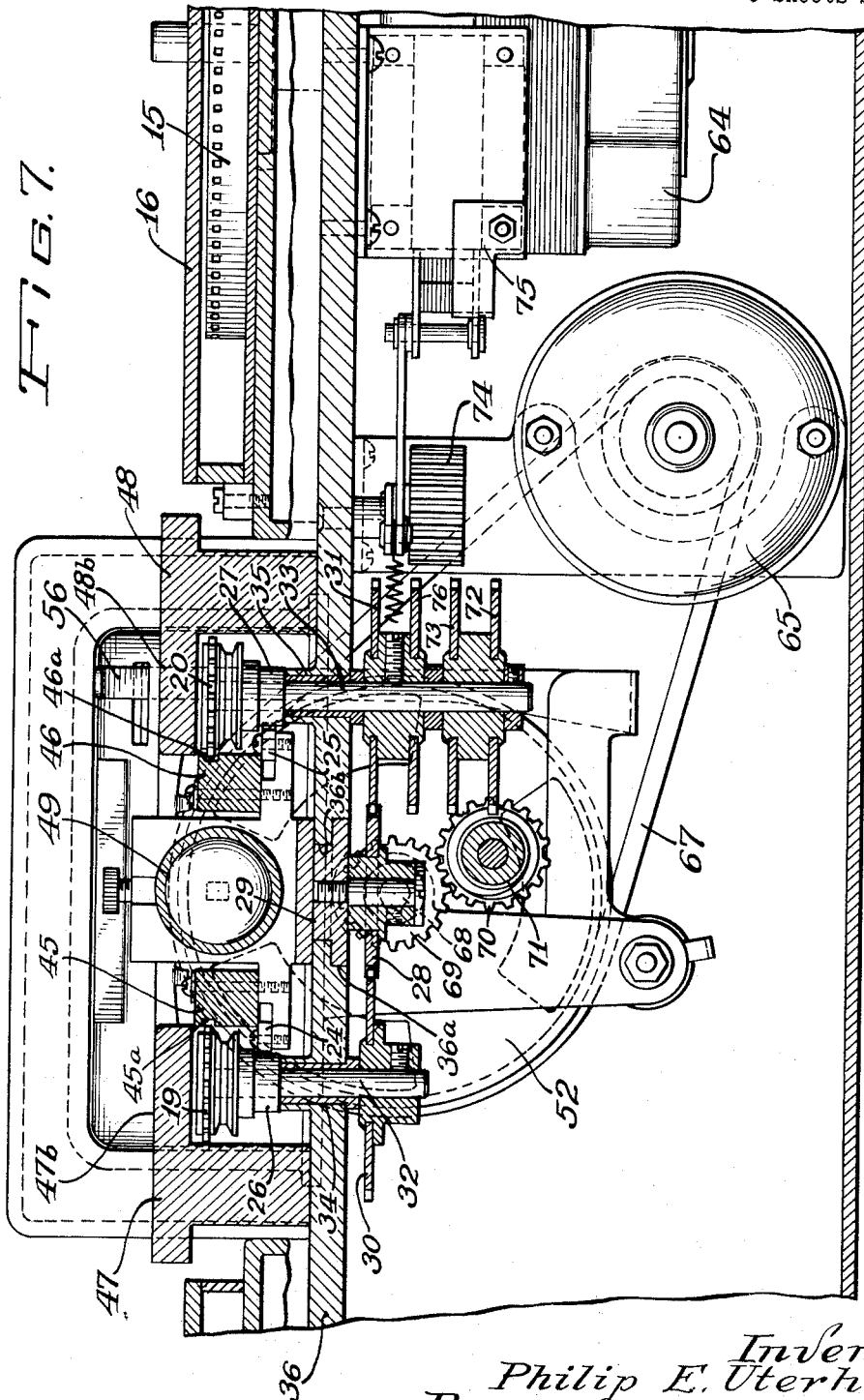
FIG. 7 is an enlarged, horizontal, sectional view taken along line 7—7 of FIG. 5.

Referring now in detail to the drawings, there is shown a motion picture projector 14 in which a known perforated film 15 carried by a supply reel or magazine 16 is completely threaded in the projector simply by manually moving the film edgewise between fixed threading guides 17 and 18 and sprockets 19 and 20, as illustrated in FIG. 4, with carriage or gate assembly 21 retracted, and then the user pushes the carriage assembly from its open or retracted position shown in FIG. 4 to its closed or operative position as shown in FIG. 5. As the carriage assembly is so moved, a resiliently mounted pressure plate 23 first engages the film and pushes the film into engagement with the sprockets 19 and 20 and then friction bars or toothless racks 24 and 25 engage friction facings or rollers 26 and 27 (FIG. 7) of rubber, plastic or other suitable clutch material keyed to the sprockets 19 and 20 and rotate the sprockets in in-running (loop-forming) directions, an idler gear 28 carried by carriage plate 29 of the gate assembly 21 at this time being out of engagement with gears 30 and 31 which are keyed to shafts 32 and 33 which are rigid with the sprockets 19 and 20 and are mounted rotatably in bearings 34 and 35 carried by mechanism plate 36. The friction bars 24 and 25 and the rollers 26 and 27 are, in effect, toothless racks and pinions. The carriage plate is slidable along guide edges 36a and 36b defining a guideway in the mechanism plate 36.

Figure 6:
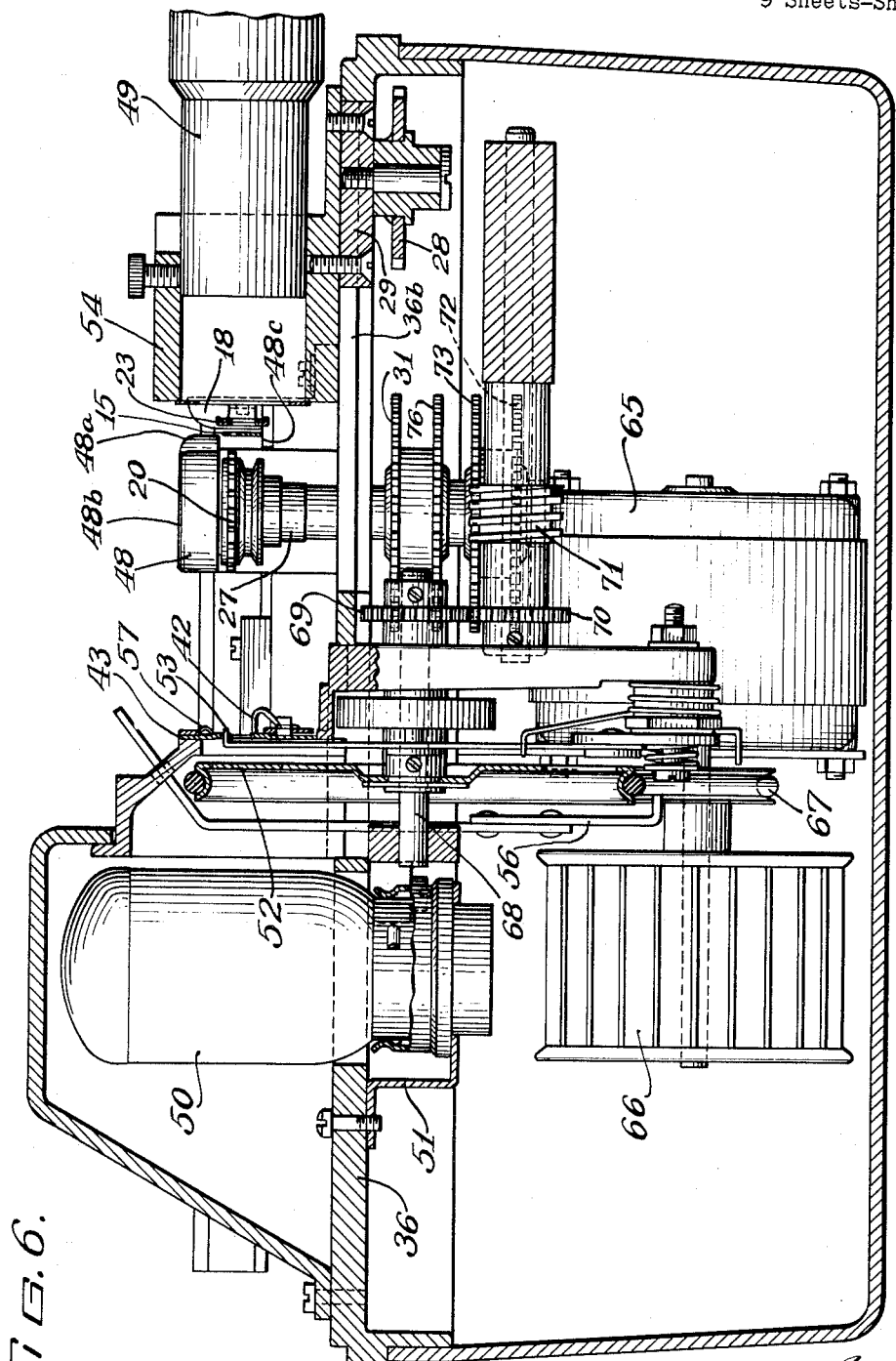
FIG. 6 is an enlarged, vertical, sectional view taken along line 6—6 of FIG. 4.

After the film 15 meshes with the sprockets 19 and 20, the racks 24 engage the facings 26 and rotate the sprockets in loop-forming directions until loops 15a and 15b (FIG. 5) in the film are formed. After these loops are formed, the pressure plate 23 moves the portion of the film between the loops onto tapered lower guides 41 and 42 carried by an aperture plate 43 and against the aperture plate. Also, during this last portion of the closing movement of the gate assembly 21, the racks 24 and 25 move out of engagement with the rollers 26 and 27, relieved portions 24a and 25a then being adjacent the rollers 26 and 27, and the gear 28 is carried into driving mesh with the gears 30 and 31. As the gate assembly 21 is closed and just after the film 15 meshes with the sprockets 19 and 20, sprocket guards 45 and 46 having grooves 45a and 46a move into positions holding the film in mesh with the sprockets, straight dwell portions 45b and 46b holding the film on the sprockets during the closing movement and then, at the last of the closing movement, arcuate portions 45c and 46c holding the film on the sprockets. The sprocket guides are rigidly fixed to the carriage plate 29. Cover members 47 and 48 having tapered edges 47a and 48a of plate portions 47b and 48b co-operate with the guides 17 and 18 to initially thread the film. The cover members also have shelves 47c and 48c (FIGS. 4 and 6) on which the lower edge of the film rests with the portion of the film between the shelves laterally aligned with the film guideway at the aperture plate 43, this guideway being defined by the guides 41 and 42 and upper guide member 57. The cover members 47 and 48 also have rounded film guiding portions 47d and 48d. The carriage plate 29 also carries a projection lens 49 which turns the image 90°, a projection lamp 50 (FIG. 6) of the internal reflector type being mounted by mount 51 secured to the mechanism plate 36 and supplying light through a known shutter 52 driven in synchronism with the sprockets and a known shuttle 53. A framing lever mechanism 56 of a known type is provided. A tubular block or holder 54 carries the lens 49 and the pressure plate 23. A spring pressed detent 55 serves to hold the carriage assembly 22 in its closed position while permitting deliberate opening of the carriage assembly.

Figure 2:
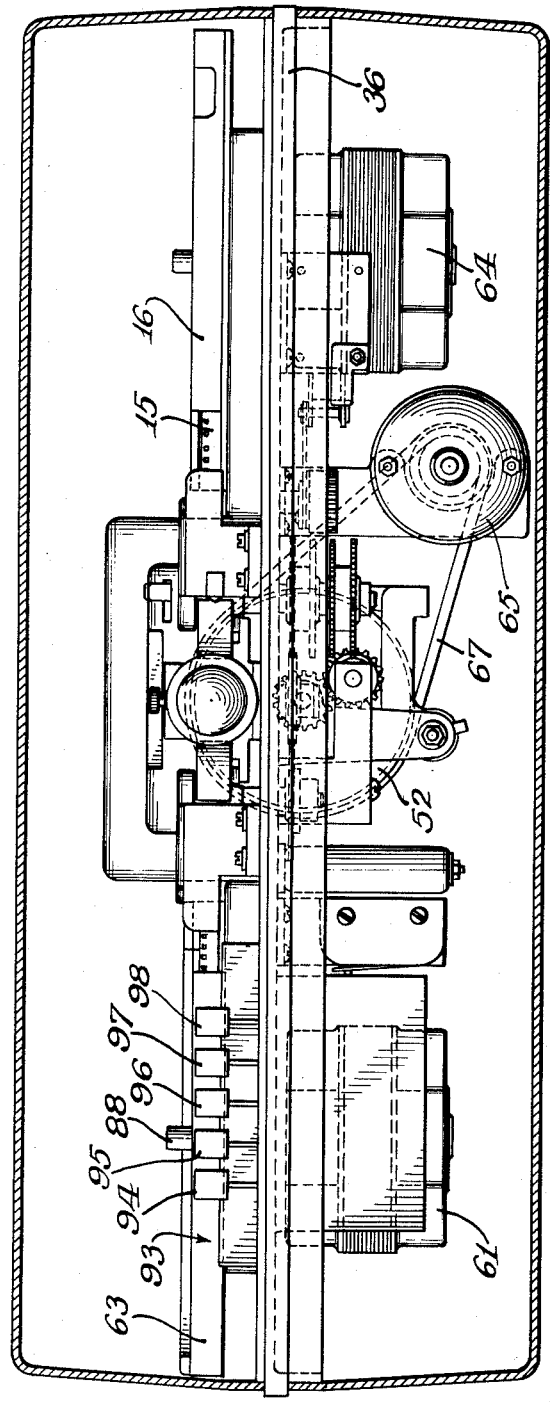
FIG. 2 is a vertical sectional view taken along line 2—2 of FIG. 1.
Figure 3:
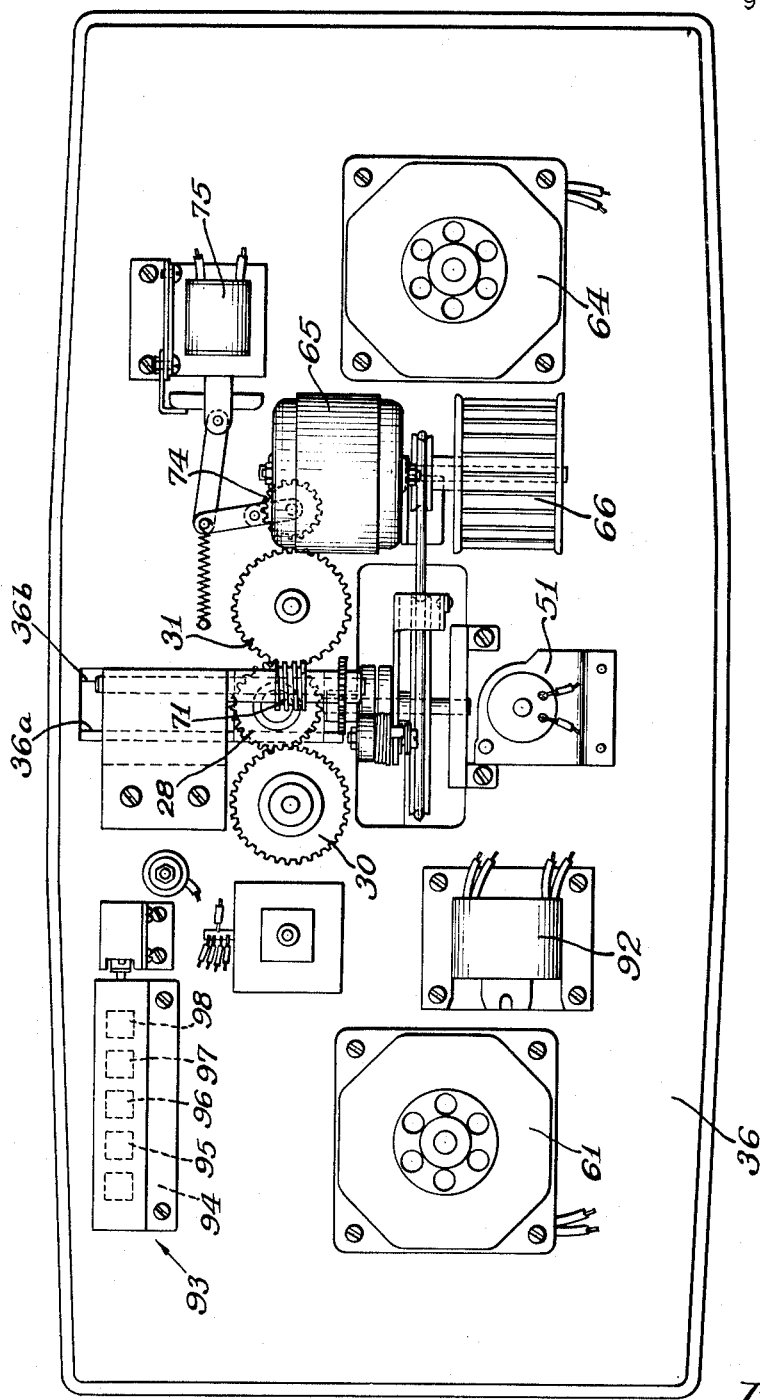
FIG. 3 is a bottom plan view of the projector of FIG. 1.

The drive system of the projector 14 includes a motor 61 (FIG. 2) for driving forwardly the take-up reel 62 mounted in a magazine 63, a motor 64 for driving the supply reel or magazine 16 in a rewind direction, and a reversible motor 65 for driving selectively either in forward or reverse the shuttle or intermittent 53, shutter 52 and sprockets 19 and 20, the motor 65 also driving a fan 66 (FIG. 3) for cooling. The motor 65 drives the shutter through belt 67 (FIGS. 6 and 7) and the shutter drives the sprockets through shaft 68, gear 69, gear 70, spiral gear 71, gears 72 and 73 keyed together and rotatable on shaft 33, gear 74 movable by solenoid 75 into engagement with the gear 73 and gear 76, the gear 76 and gear 31 keyed to shaft 33, the gear 28 and the gear 30.

Figure 1:
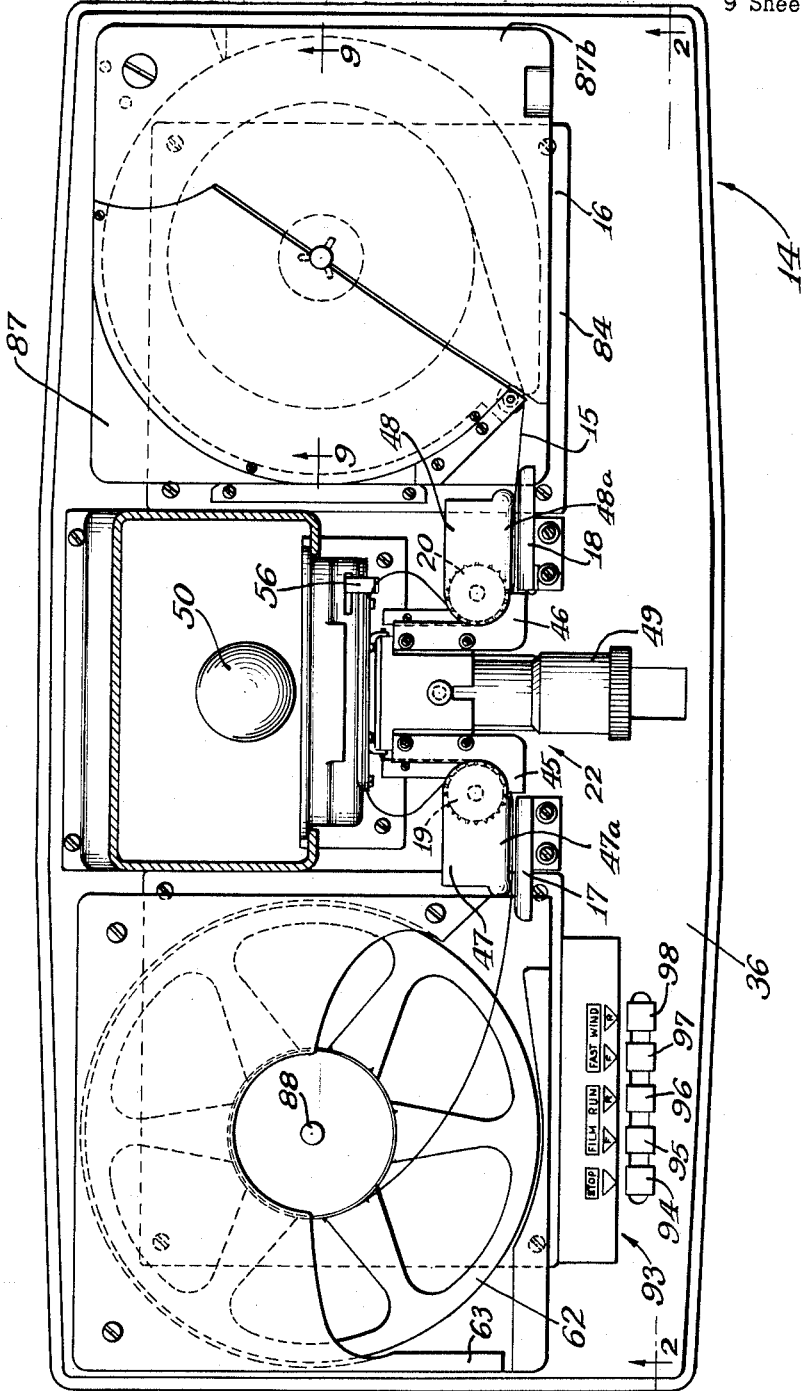
FIG. 1 is a top plan view of a motion picture projector forming one embodiment of the invention.
Figure 8:
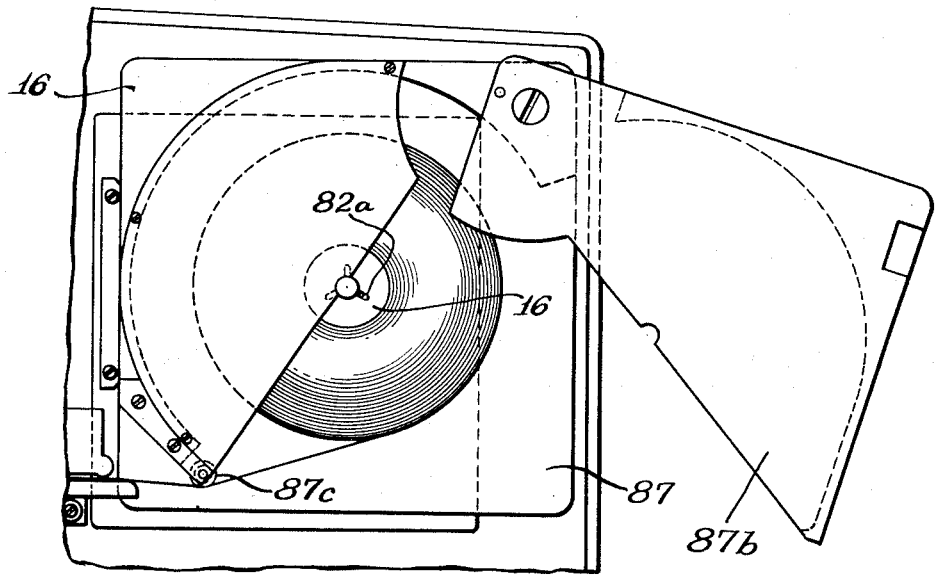
FIG. 8 is an enlarged, fragmentary, top plan view of a film magazine of the projector of FIG. 1.
Figure 9:
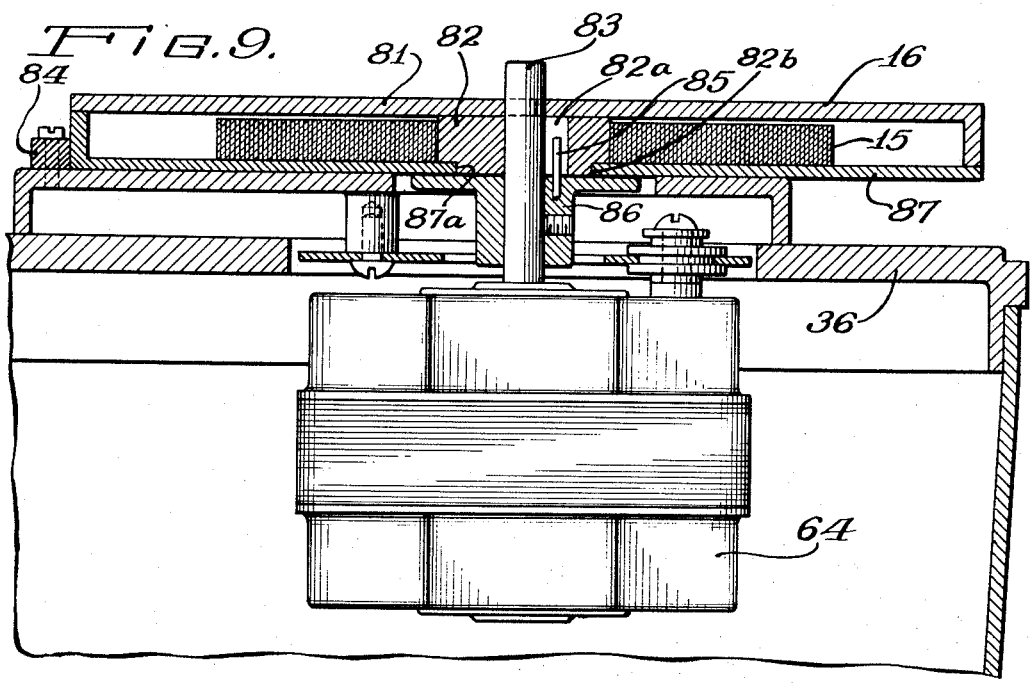
FIG. 9 is an enlarged, vertical, sectional view taken along line 9—9 of FIG. 1.

The magazine 16 (FIGS. 1, 8 and 9) includes housing portion 81 mounting hub 82 rotatably and designed to fit removably over motor shaft 83 and into corner member 84 fixed to the mechanism plate 36. The hub has keying slots 82a for receiving driving pin 85 mounted on flanged collar 86 keyed to the shaft 83 of motor 64. The magazine has a bearing hole 87a of housing 87 into which reduced portion 82b of the hub rotatably fits. The housing also has a hinged cover half 87b and a guide roller 87c. The take-up magazine 63 (FIGS. 1 and 2) is generally similar to the magazine 16 except that the magazine 63 has no hinged cover and mounts the take-up reel 62 along with shaft 88 of the fast forward motor 61 and the reel 62 has a self-latching hub portion 62a for automatically latching the forward end of the film thereto.

Figure 10:
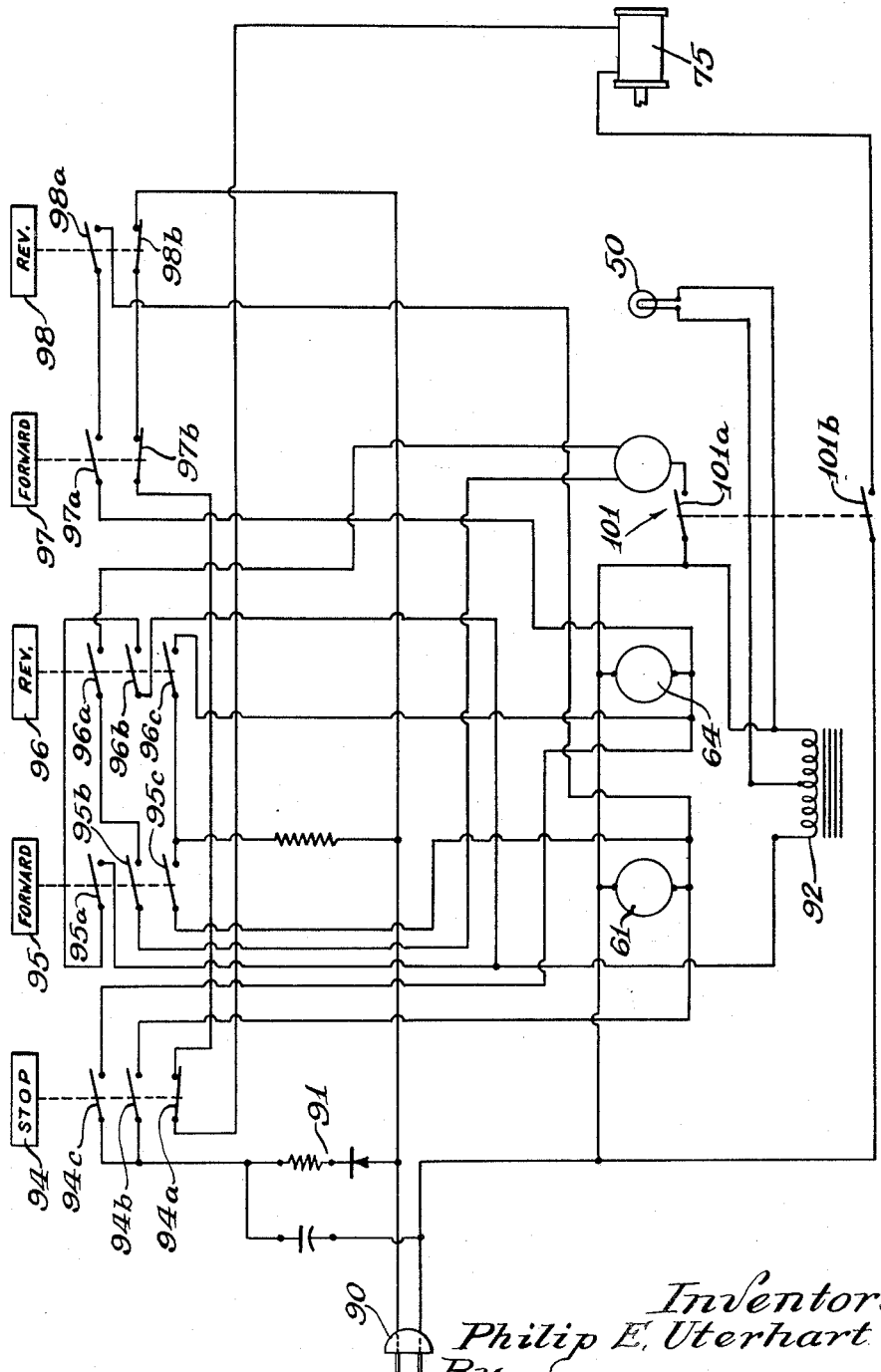
FIG. 10 is a diagrammatic view of a control circuit of the projector of FIG. 1.

A circuit for controlling the projector is shown in FIG. 10 and includes a plug 90, a rectifying network 91, an auto-transformer 92 and selector switch 93, which has a stop push-button 94, a forward push-button 95, a reverse push-button 96, a "Fastwind" forward push-button 97 and a "Fastwind" reverse or rewind push-button 98. The push-buttons 95 to 98 are adapted to be selectively locked in depressed positions and interlock by well known structure so that only one is locked in depressed or actuated condition at one time, the depression of another or the push-button 94 serving to release the locked push-button. The push-button 94 is of the momentary type and includes normally closed contacts 94a and normally open contacts 94b and 94c. When the push-button 94 is depressed manually, the contacts 94a open to cut off power from the solenoid 75 so that the drive to the sprockets 19 and 20 is disengaged and the contacts 94b and 94c close to supply direct current to the motors 61 and 64 to brake these motors to stop the reels.

When the push-button 95 is depressed manually, contacts 95a, 95b and 95c are moved from open to closed positions. This supplies power to lamp 50, the solenoid 75 and the reversible motor 65 to run the motor 65 in the forward direction, a limit switch 101 being actuated by the carriage assembly 22 when the carriage assembly is in its closed position to close contacts 101a and 101b. To run the projector in reverse, the carriage assembly 22 is closed and closes limit switch 101 and then push-button 96 is depressed to close contacts 96a, 96b and 96c to run the motor 65 in reverse and energize the lamp 50 and the solenoid 75. For fast forward winding, the push-button 97 is depressed to close contacts 97a to energize motor 61 and open contacts 97b to break the braking circuit to the motor 61. For fast rewind (reverse) winding, the push-button 98 is depressed to close contacts 98a to energize motor 64 and open contacts 98b in the braking circuit to the motor 64.

While the invention is thus described, it is not wished to be limited to the precise details described, as changes may be readily made without departing from the spirit of the invention.

What is claimed is:

1. In a motion picture projector, a stationary aperture plate, a pair of sprockets bracketing the aperture plate and spaced forwardly of the aperture plate, carriage means movable between the sprockets toward and away from the aperture plate, a pair of sprocket guards carried by the carriage means, each sprocket guard having an elongated straight portion movable substantially tangentially along one of the sprockets as the carriage means is moved toward the aperture plate, each sprocket guard also having an arcuate portion movable to one of the sprockets as the carriage means nears the end of its movement toward the aperture plate, a pressure plate carried by the carriage means to and from the aperture plate, means for rotating the sprockets to advance film in the same direction when the pressure plate is adjacent to the aperture plate, and means operable by movement of the carriage means toward the sprockets for rotating the sprockets to both advance the film toward the aperture plate as the carriage means moves the pressure plate to the aperture plate and to form loops between the sprockets and the aperture plate.

2. In a straight line threading projector including an aperture plate along which a film is adapted to travel and a pressure plate, the combination therewith of a member carrying the pressure plate and movable between a retracted position in which the pressure plate is spaced away from the aperture plate and an operative position in which the pressure plate is adjacent the aperture plate, a pair of sprockets bracketing the aperture plate and rotatable on fixed axes, means for driving the sprockets in directions advancing film in the same direction and including disconnectible coupling means between the sprockets, actuating means carried by the member to cause the coupling means to be disconnected when the member is not in its operative position and to be connected when the member is in its operative position, rack means carried by the member, pinion means keyed to the sprockets and rotatable by the rack means as the member is moved toward its operative position, and a pair of sprocket guards carried by the member and having straight portions movable tangentially along the sprockets as the member is moved toward its operative position, the sprocket guards also having arcuate end portions movable to positions substantially concentric with the sprockets.

3. In a straight line threading projector including an aperture plate along which a film is adapted to travel and a pressure plate, the combination therewith of a member carrying the pressure plate and movable between a retracted position in which the pressure plate is spaced away from the aperture plate and an operative position in which the pressure plate is adjacent the aperture plate, a pair of sprockets bracketing the aperture plate and rotatable on fixed axes, means for driving the sprockets in directions advancing film in the same direction including disconnectible coupling means between the sprockets, actuating means carried by the member to cause the coupling means to be disconnected when the member is not in its operative position and to be connected when the member is in its operative position, said means for driving the sprockets and said actuating means including a pair of gears keyed to the sprockets and out of mesh with each other, and an idler gear carried by the member and meshing with the pair of gears only when the member is in its operative position, rack means carried by the member, and pinion means keyed to the sprockets and rotatable by the rack means as the member is moved toward its operative position.

4. The projector of claim 3 wherein the means for driving the gears includes a motor drive, second disconnectible coupling means for connecting the motor drive to one of the sprockets, and means for actuating the second disconnectible coupling means to connect the motor drive to said one of the sprockets.

5. In a projector, a horizontal mechanism plate, an aperture plate on the mechanism plate in a fixed position, a pair of sprockets positioned forwardly of the aperture plate and at opposite ends of the aperture plate, a pair of pinion means keyed to the sprockets, a carriage slidable on the mechanism plate between the sprockets and toward and away from the aperture plate between a retracted position and an operative position, a pressure plate carried by the carriage and movable thereby from a retracted position spaced forwardly of the sprockets to an operative position adjacent the aperture plate, a pair of racks carried by the carriage and as the carriage is moved from its retracted position to its operative position movable by the carriage from positions out of engagement with the pinion means into driving engagement therewith and then on past the pinions as the carriage comes to its operative position to rotate the pinions in loop-forming directions, a first gear keyed to one of the sprockets, a second gear keyed to the other sprocket, a third gear movable by the carriage as the carriage reaches its operative position from a position not connecting the first and second gears to a position connecting the first and second gears, and projector driving means for driving one of the gears.

6. The projector of claim 5 wherein the third gear is mounted on the carriage and is movable thereby from a position out of mesh with the first and second gears to a position in mesh with the first and second gears as the carriage reaches its operative position.

7. The projector of claim 5 wherein the projector driving means includes an electric motor for driving one of the gears, and a limit switch operable by the carriage to start the motor as the carriage reaches its operative position.

References Cited in the file of this patent

UNITED STATES PATENTS

| | | |
|---|---|---|
| 1,714,461 | Chanier et al. | May 21, 1929 |
| 2,472,143 | Briskin | June 7, 1949 |